(12) United States Patent
Veltri et al.

(10) Patent No.: US 7,556,322 B2
(45) Date of Patent: *Jul. 7, 2009

(54) GRADUATED RELEASE/PROPORTIONING VALVE

(75) Inventors: Michael J. Veltri, Pittsburgh, PA (US); Jeffrey D. Wurzer, Turtle Creek, PA (US)

(73) Assignee: Wabtec Holding Corp., Wilmerding, PA (US)

(*) Notice: Subject to any disclaimer, the term of this patent is extended or adjusted under 35 U.S.C. 154(b) by 159 days.

This patent is subject to a terminal disclaimer.

(21) Appl. No.: 11/242,184

(22) Filed: Oct. 3, 2005

(65) Prior Publication Data

US 2006/0028062 A1  Feb. 9, 2006

Related U.S. Application Data

(63) Continuation-in-part of application No. 11/028,779, filed on Jan. 3, 2005, now Pat. No. 6,971,723.

(60) Provisional application No. 60/539,482, filed on Jan. 27, 2004.

(51) Int. Cl.
*B60T 8/22* (2006.01)
*B60T 8/18* (2006.01)

(52) U.S. Cl. .......... 303/22.7; 303/22.2; 303/22.6; 303/22.8; 303/118.1; 303/74

(58) Field of Classification Search .......... 303/118.1, 303/22.2, 22.6, 22.7, 22.8, 74, 2, 8, 6, 22
See application file for complete search history.

(56) References Cited

U.S. PATENT DOCUMENTS

| | | | |
|---|---|---|---|
| 2,068,342 A | 1/1937 | McClure | |
| 3,376,080 A | 4/1968 | Kettering et al. | |
| 3,671,086 A | 6/1972 | Scott | |
| 4,080,005 A | 3/1978 | Engle | |
| 4,235,477 A | 11/1980 | Hart | |
| 4,235,478 A | 11/1980 | Billeter | |
| 4,291,923 A | 9/1981 | Billeter | |
| 4,364,609 A | 12/1982 | Wickham | |
| 4,417,767 A | 11/1983 | Billeter | |
| 4,583,790 A | 4/1986 | Scott | |
| 4,714,297 A * | 12/1987 | Vaughn | 303/33 |
| 4,801,179 A | 1/1989 | Hintner | |

(Continued)

OTHER PUBLICATIONS

Wabco Parts Catalog, "P-1 Load Proportional Valve", 3229-50 Apr. 1987, pp. 1-4.

(Continued)

*Primary Examiner*—Robert A Siconolfi
*Assistant Examiner*—Mahbubur Rashid
(74) *Attorney, Agent, or Firm*—The Webb Law Firm, P.C.

(57) ABSTRACT

A release graduating proportioning valve for a rail car brake system having a brake pipe, a brake cylinder, and a load sensor valve which selectively connects the control volume to the brake cylinder. The release graduating proportioning valve has a proportioning piston movable between a first position at which a control volume is isolated from atmosphere to a second position at which the control volume is connected to atmosphere, to enable graduated release of brake cylinder pressure. A port to atmosphere is provided in the valve body, and the port is connected to, or isolated from, the control volume responsive to movement of the proportioning piston.

9 Claims, 12 Drawing Sheets

U.S. PATENT DOCUMENTS

| | | |
|---|---|---|
| 4,844,554 A | 7/1989 | Rojecki |
| 5,005,915 A | 4/1991 | Hart et al. |
| 5,100,207 A | 3/1992 | McKay |
| 5,106,168 A | 4/1992 | McKay |
| 5,269,595 A | 12/1993 | McKay et al. |
| 5,303,987 A | 4/1994 | McKay |
| 5,340,203 A | 8/1994 | Gowda |
| 5,346,291 A | 9/1994 | Marsh et al. |
| 5,662,391 A * | 9/1997 | McKay ............... 303/22.4 |
| 6,206,483 B1 * | 3/2001 | LaLone ............... 303/22.2 |
| 6,305,756 B1 * | 10/2001 | Scott et al. ............ 303/22.2 |

OTHER PUBLICATIONS

Wabco Parts Catalog, "S-1 Load Sensor Valve", 3229-25, Sup. 10, Dec. 1979.

* cited by examiner

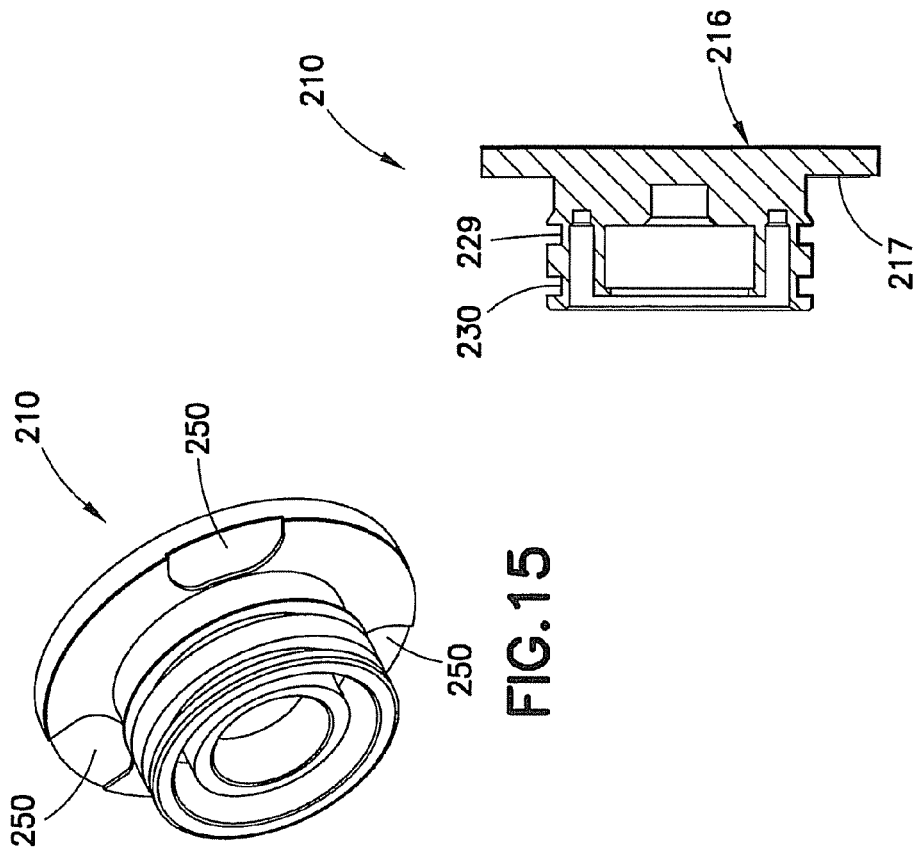
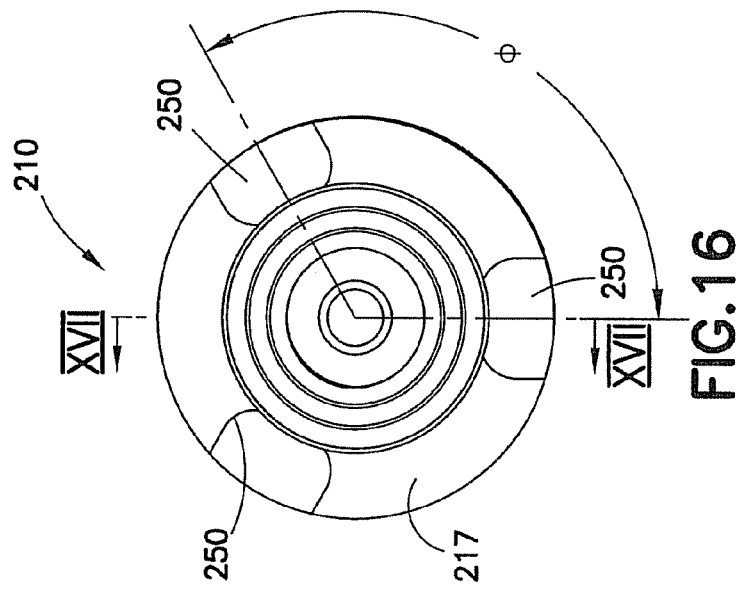

GRADUATED RELEASE/PROPORTIONING VALVE

CROSS-REFERENCE TO RELATED APPLICATIONS

This application is a continuation in part application of U.S. patent application Ser. No. 11/028,779, filed Jan. 3, 2005 now U.S. Pat. No. 6,971,723 and allowed Jun. 14, 2005, which claims priority to U.S. Provisional Patent Application Ser. No. 60/539,482, filed Jan. 27, 2004.

BACKGROUND

The invention relates generally to brake equipment for rail cars, and more particularly to an improved graduated release proportioning valve for empty-load brake equipment to implement a graduated release of braking effort on individual rail cars depending upon whether the rail cars are loaded or empty.

Conventional proportioning valves for empty-load braking equipment are well known in the art. U.S. Pat. No. 4,080,005, assigned to the assignee of the present application, which is hereby incorporated herein by reference, describes a prior art "Empty-load Fluid Pressure Brake System Including Proportioning Valve" for a rail car. As summarized in that patent, a control valve and the brake operating motor are interconnected by a flow path which includes a proportioning valve which is normally biased open and a changeover valve which selectively renders the proportioning valve effective dependent upon whether the car is empty or loaded. In the car-empty setting, the changeover valve permits auxiliary reservoir pressure to be proportionately reduced by the proportioning valve. A spring biases the proportioning valve open. In the empty setting of the changeover valve, this spring delays proportioning action until the quick service brake cylinder pressure development is complete. Thereafter, the proportioning action commences and continues during the development of pressure in the volume reservoir. It will be seen that the initial brake cylinder pressure development is unaffected by the proportioning valve, and this development is not delayed on the empty cars. The quick service feature is thus preserved.

The changeover valve could be manually set in either of its two positions, but it is preferred to use an automatic valve which normally assumes the load setting but on an empty car moves to empty setting as an incident to the automatic control valve moving to service position. The automatic changeover valve includes a means to sense the interval between sprung and unsprung parts of the car, the interval being smaller on loaded cars than on empty cars.

The proportioning valve described above has been manufactured by Wabtec™ as the "P-1 Proportioning Valve"™, as a primary component of the Wabtec™ "SC-1 Empty/Load Equipment"™ for some 35 years. Throughout that time the P-1™ has been a trouble-free valve that has provided highly reliable service on tens of thousands of freight cars.

However, a disadvantage of this proportioning valve, and other known proportioning valves, is that conventional proportioning valves do operate in a graduated release brake system. Recent advances in rail car brake systems include brake systems and equipment which permit rail cars to be controlled in a graduated release braking mode. Therefore, it would be desirable to provide a proportioning valve, similar to the P-1™ proportioning valve described above, except which can be operated in a graduated release braking mode.

SUMMARY

According to the invention, a release graduating proportioning valve for a rail car brake system having a brake pipe, a brake cylinder, and a load sensor valve for detecting an empty/loaded car condition, is provided which can comprise a proportioning piston having a control volume communicating on a first side of the piston and a second volume communicating on a second side of the piston; a valve body in which the proportioning piston is movably received, the valve body having a port to atmosphere; the load sensor valve having an empty car setting in which the control volume is connected to atmosphere via the load sensor valve, and a loaded car setting in which the control volume is connected to the brake cylinder via the load sensor valve; and the proportioning piston movable between first and second positions, the control volume isolated from the port to atmosphere at the first position, and the control volume communicating with the port to atmosphere at the second position, wherein the control volume is connected to atmosphere responsive to movement of the proportioning piston. Movement of the proportioning piston can be responsive to pressure in the control volume acting on top of the piston and brake pipe pressure acting on the underside of the piston.

The release graduating proportioning valve can further comprise the valve body having a bore, the proportioning piston having a skirt portion slidably received in the bore, a first air passage through the bore which communicates with the control chamber, at least one seal carried by the skirt portion, wherein at the first position of the piston the seal is positioned between the first air passage and the port to atmosphere such that the seal isolates the control volume from atmosphere, and wherein at the second position the control volume is connected to atmosphere via the first air passage. Additionally, a bushing can be provided in the bore such that the skirt portion is slidably received in the bushing, and the first air passage is provided through the bushing. The bushing can further include an inner surface adjacent the skirt portion and an outer surface adjacent the bore, wherein the outer surface can have an annular air passage communicating with the port to atmosphere and the first air passage is provided through the inner surface in communication with the annular air passage, such that the first air passage connects the control volume to atmosphere via the annular air passage and the port to atmosphere when the proportioning piston moves to the second position. The first air passage can be a plurality of through-holes provided at spaced apart locations around a perimeter of the inner surface.

The back face of the proportioning piston can have one or more recessed regions to facilitate air flow from the control volume to the atmosphere when the back face of the piston is down against the valve body, such as at the second position at which the through-holes are connected to the atmosphere. Additionally, a pair of spaced apart seals can be used such that the through-holes in the bushing are captured between the seals when the piston is at the first position with the control volume isolated from atmosphere.

Another embodiment of a release graduating proportioning valve can comprise a proportioning valve having conventional components used in combination with a graduated release valve member. By way of example, the conventional components include a proportioning piston having a control volume communicating on a first side of the piston and a second volume communicating on a second side of the piston. The load sensor valve conventionally has an empty car setting in which the control volume is connected to atmosphere via the load sensor valve, and a loaded car setting in which the control volume is connected to the brake cylinder via the load sensor valve.

The graduated release valve member can be interposed between the control volume and atmosphere, independent of the load sensor valve. The graduated release valve member has an open position, at which the control volume is connected to atmosphere via the graduated release valve member, and a closed position, at which the graduated release valve member does not connect the control volume to atmosphere. The graduated release valve member is activated by movement of the proportioning piston, to provide a graduated release of brake cylinder pressure, via the control volume.

The release graduating proportioning valve can further comprise incorporating the graduated release valve member into the top of a conventional proportioning valve, such that one end of the graduated release valve member extends into the control volume the opposite end extends outside of the proportioning valve, so as to selectively communicate the control volume with the atmosphere independently of the load sensor valve. The end of the graduated release valve member inside the control volume can be positioned adjacent a diaphragm member which separates the control volume from the second volume on the opposite side of the proportioning piston. The diaphragm, and thus the end of the graduated release valve member, moves with the proportioning piston responsive to changes in pressure in the second volume. It is this movement which activates the graduated release valve member to connect, or isolate, the control volume to atmosphere. It should be noted that in this context, the control volume may not be totally isolated from atmosphere due to the existence of the load sensor valve connection to the control volume, which can independently connect the control volume to atmosphere.

In certain embodiments, the graduated release valve member may have a longitudinal exhaust passage and a seat at the end of the valve member which closes the exhaust passage against the diaphragm. In this case, the exhaust passage will only connect the control volume to atmosphere when the proportioning piston, and the diaphragm, move sufficiently away from the seat to permit the control volume to communicate with the exhaust passage.

In other embodiments, the graduated release valve member may comprise a spool enclosed in a housing, and wherein the spool has radial and/or annular exhaust passages which connect with, depending on the position of the spool, an exhaust vent through the housing out to atmosphere. In this case, the end of the spool can similarly be positioned adjacent the diaphragm such that movement thereof, via the proportioning piston, activates the spool to exhaust or isolate the control volume.

The release graduating proportioning valve can further comprise a spring or other resilient member to bias the graduated release valve member toward a closed position in which the control volume is not connected to atmosphere. Additionally, the release graduating proportioning valve can further comprise a graduated release valve member o-ring retainer, wherein the retainer can include upper and lower valve seat positioners, with the o-ring disposed therebetween. The lower positioner can have a skirt portion which at least partially captures the o-ring, and the upper positioner can have a vent passage communicating on a back side of the o-ring to inhibit a build up of pressure on the back side thereof which could cause the o-ring to blow-out of its position.

Further details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings in which:

FIG. 15 is a perspective view of an embodiment of a piston for a release graduating proportioning valve such as shown in FIG. 11;

FIG. 16 is a top plan view of the piston in FIG. 12;

FIG. 17 is a section view taken through line XVII-XVII in FIG. 16;

DETAILED DESCRIPTION OF CERTAIN EMBODIMENTS

Figure 1:
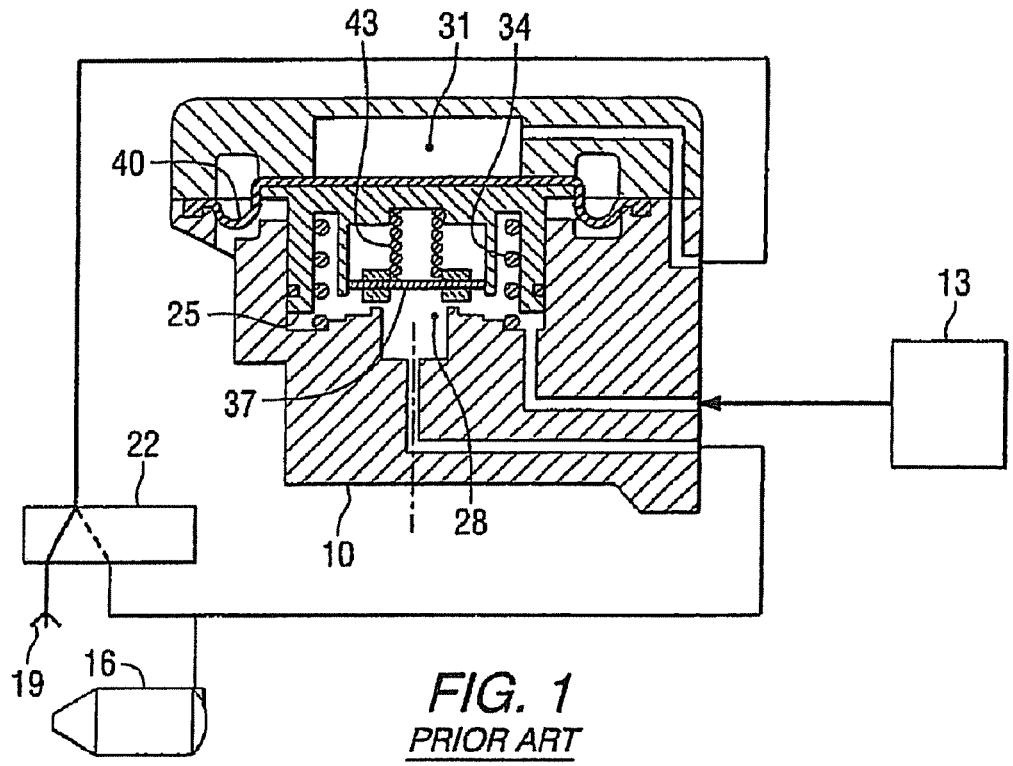
FIG. 1 illustrates a prior art proportioning valve in a normal, "full open" position.

Referring now to the drawing figures, in which like reference numbers designate like components, a prior art proportioning valve 10, in this case, which can be the P-1™ proportioning valve is illustrated. The conventional proportioning valve 10 provides delivery of full brake cylinder pressure ("BCP") from the brake control valve 13 to the brake cylinder 16 when the rail car is loaded, and decreases the brake cylinder pressure when the car is empty, to either 60%, 50% or 40% of the full loaded-car pressure. On the empty car, when downstream BCP is reduced it is also admitted to an equalizing reservoir (not shown), which is sized in accord with the degree of proportioning to assure that the upstream BCP and the supply reservoir will equalize at the same pressure as occurs when the car is loaded. The conventional proportioning valve 10 is intended for use only with direct-release brake systems. The P-1™ proportioning valve is described in Wabtec™ Parts catalog No. 577723 (April 1987); and in Westinghouse Air Brake Company™ publication "*AB Single Freight Car Air Brake Equipment with ABDX Type Control Valve*" No. 5062-19 (August 1991). Both of these publications are hereby incorporated herein by reference.

The structure of the conventional P-1™ proportioning valve, hereafter referred to simply as the proportioning valve 10, is illustrated in FIG. 1, diagrammatically connected to a brake control valve 13, the brake cylinder 16, and the atmosphere 19 via a load sensor valve 22. The proportioning valve 10 is comprised of a proportioning piston 25 interposed between the brake control valve 13 and the brake cylinder 16. Brake cylinder pressure from the brake control valve 13 and pressure in the brake cylinder 16 can communicate with a first volume 28 on the underside of the proportioning piston 25, and a control volume 31 can communicate on top of the proportioning piston 25. A main piston spring 34 also acts on the underside of the proportioning piston 25. The load sensor valve 22 is interposed between the atmosphere 19 and both the control volume 31 and the brake cylinder 16. When the rail car is loaded, the load sensor valve 22 will open the control volume 31 on top of the proportioning piston 25 to atmosphere 19, so the main piston spring 34 as well as BCP from the brake control valve 13 forces the proportioning piston 25 upward, lifting the caged supply check valve 37 up and away from its seat. This allows full supply pipe pressure from the brake control valve 37 to pass through the open check valve and flow directly to the brake cylinder 16 to provide maximum BCP.

When the brakes are released, the proportioning piston 25 remains in its uppermost position, which allows the BCP to exhaust back through the brake control valve 13 (and a retainer, not shown). It should be noted that BCP is not admitted to the equalizing reservoir when the car is loaded.

On an empty car, once BCP exceeds approximately 12 psi, the load sensor valve 22 reacts to the empty-car spring deflection to open a port allowing the downstream BCP to be admitted back to the control volume 31 acting on the top of the proportioning piston 25, (and also to the equalizing reservoir). When sufficient, this pressure acts to force the proportioning piston 25 downward to seat the supply check valve 37. Because of the larger effective area above the proportioning piston, the pressure in the control volume 31 does not need to be as great as the pressure acting on the smaller area beneath the proportioning piston 25 to counteract it and balance the opposing piston force. Therefore, the downstream pressure acting on the larger top area will increase only until it is sufficient to overcome the higher pressure from the control valve 13 acting on the smaller area, combined with the main piston spring 34. The degree of pressure proportioning (60%, 50% or 40%) is thus set by the ratio of the opposing effective areas above and below the proportioning piston 25.

In setting the proportioning ratio, by design, the full area of the diaphragm 40 is allowed to remain constant, and the various ratios are achieved by reducing the diameter, and thus the effective area, of the piston extension and o-ring seal. The standard proportioning valve 10 has been proven to provide good sensitivity, and proportions the empty car BCP quite accurately.

By admitting the reduced downstream BCP to the equalizing reservoir, it is assured that the upstream pressure will equalize with the appropriate supply reservoirs during full service and emergency service at essentially the same equalization pressures as would occur on a loaded car with full BCP. These proper equalizations are important to assure timely brake releases when brake pipe pressure is restored.

When a direct brake release is made, the relatively small volume of upstream pressure between the proportioning valve 10 and the rail car brake control valve 13 will first exhaust back through the brake control valve 13, and retainer, until falling just below the lower (proportioned) downstream BCP, whereupon the downstream pressure will overcome the relatively light supply check valve spring 43 and follow back through the check valve 37, to atmosphere 19. As the pressure further reduces, it will reach a point where the main piston spring 34 will be sufficient to force the proportioning piston 25 upward, lifting the check valve 37 away from its seat and assuring a full exhaust of the BCP. Also, as the downstream BCP reduces, it will reach a pressure where the load sensor valve 22 will reset under the force of a reset spring (not shown). When this occurs, the equalizing reservoir and the control volume 31 will be isolated from the brake cylinder 16, and this pressure will exhaust directly through the load sensor valve 22 to atmosphere 19.

Although proven reliable and accurate, the standard proportioning valve 10 is not suited for a graduated release brake, because the upstream BCP must be reduced until it falls below the proportioned downstream BCP before any air will be exhausted from the brake cylinder 16.

Figure 2:
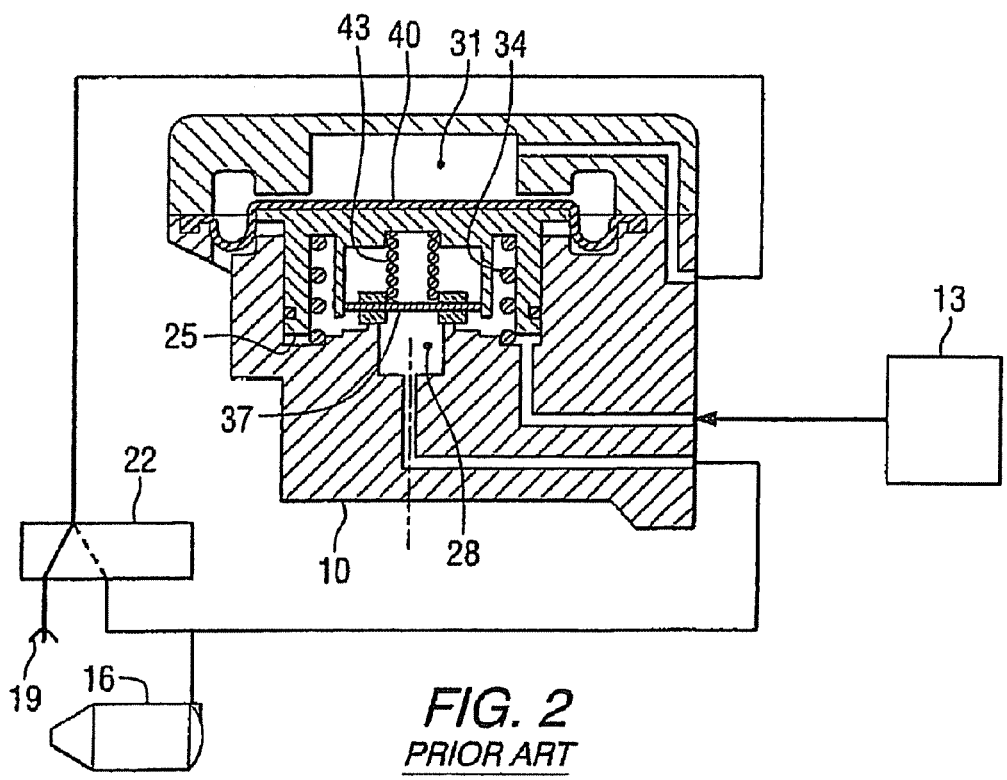
FIG. 2 illustrates the prior art proportioning valve in FIG. 1 in a "balanced" position.
Figure 3:
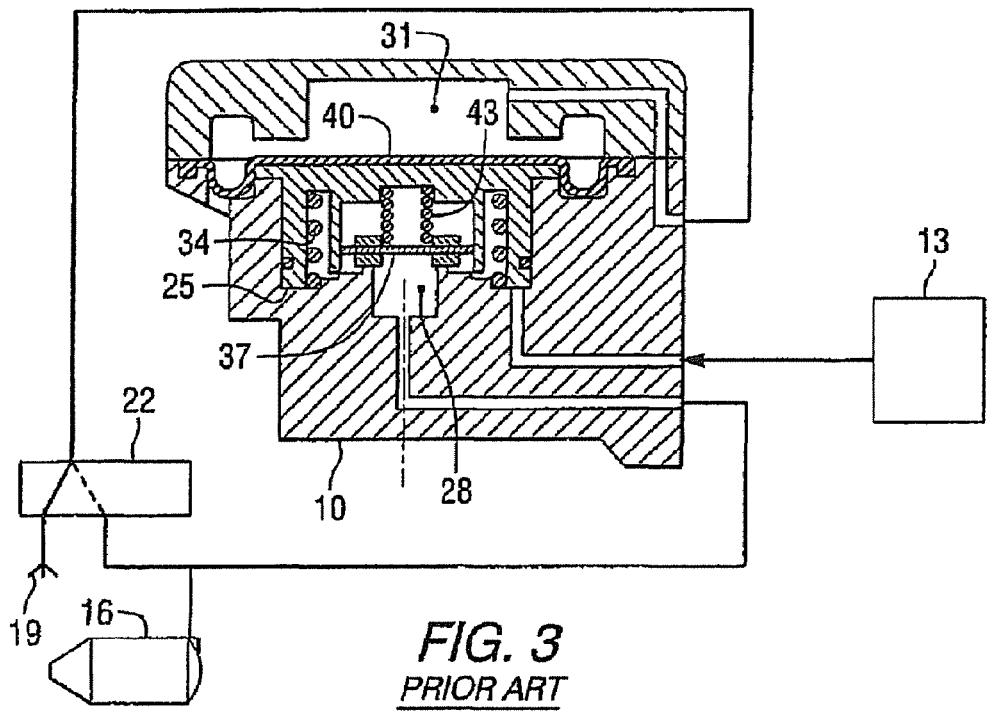
FIG. 3 illustrates the prior art proportioning valve shown in FIG. 1 in a "over travel" position.

FIGS. 1-3 illustrate three distinct operating positions of the conventional proportioning valve 10, of which only two, the "full open position" (FIG. 1) and the "balanced position" (FIG. 2), are normally used. The third position, "over travel" (FIG. 3), is a result of building tolerance into the valve 10, and is only achieved in operation when the input pressure is being reduced below the brake cylinder pressure. In direct release equipment, this is a transient condition, and has no influence on the performance of the valve 10. These three positions are discussed in more detail below.

Regardless of the load sensor valve 22 condition, the full open position of the proportioning valve 10 permits unrestricted flow of air from the brake control valve 13 to the brake cylinder 16 in both application and release. When the load sensor valve 22 is in the "empty" position and a brake application is in effect, the proportioning piston 25 settles into the balanced position, as shown in FIG. 2. In this position, any increase in supply pressure as the brakes are applied will lift the proportioning piston 25, cracking the supply check valve 37 with flow to the brake cylinder 16 resulting similar to that shown in FIG. 1. This allows brake cylinder pressure to increase, but the increase also applies to the top of the diaphragm 43, forcing the proportioning piston 25 back down until the supply check valve 37 closes once more in the balanced position. Finally, it should also be noted that when supply pressure from the brake control valve 13 is reduced, the proportioning valve will be subject to an unbalanced condition, tending to force the proportioning piston downward, beyond the balanced position. This will result in no change in brake cylinder pressure, because the lower pressure behind the check valve 37 cannot force the check valve 37 off the seat until the brake control valve 13 has exhausted pressure from the supply line, and thus reduces the pressure above the check valve 37 to the point where the brake cylinder pressure slightly exceeds the momentary value of the decreasing supply pressure from the brake control valve 13.

At this point the proportioning piston 25 will be in the over travel position, as shown in FIG. 3, and the brake cylinder pressure will flow out of the brake cylinder 16 at a pressure roughly equal to that in the supply pipe from the brake control valve 13. The over travel position will be maintained until the supply pipe pressure has been exhausted, which returns the load sensor valve 22 to its released position, and which will vent the control volume 31 above the proportioning piston 25 directly to atmosphere 19.

The movement of the proportioning piston 25 beyond the balanced position toward the over travel position is the operating range in which a graduated release valve member can be added to the proportioning valve 10 in order to provide a graduated release of a light (e.g. "empty") car brake application. Such a modified proportioning valve could then follow supply pressure proportionally throughout a graduated release of brakes, rather than blocking air in the brake cylinder 16 until the brake control valve 13 output pressure had been reduced (as much as 50%) to the lower light/empty car brake cylinder pressure produced by the proportioning valve 10 in the empty car position, as shown in FIG. 3.

Figure 4:
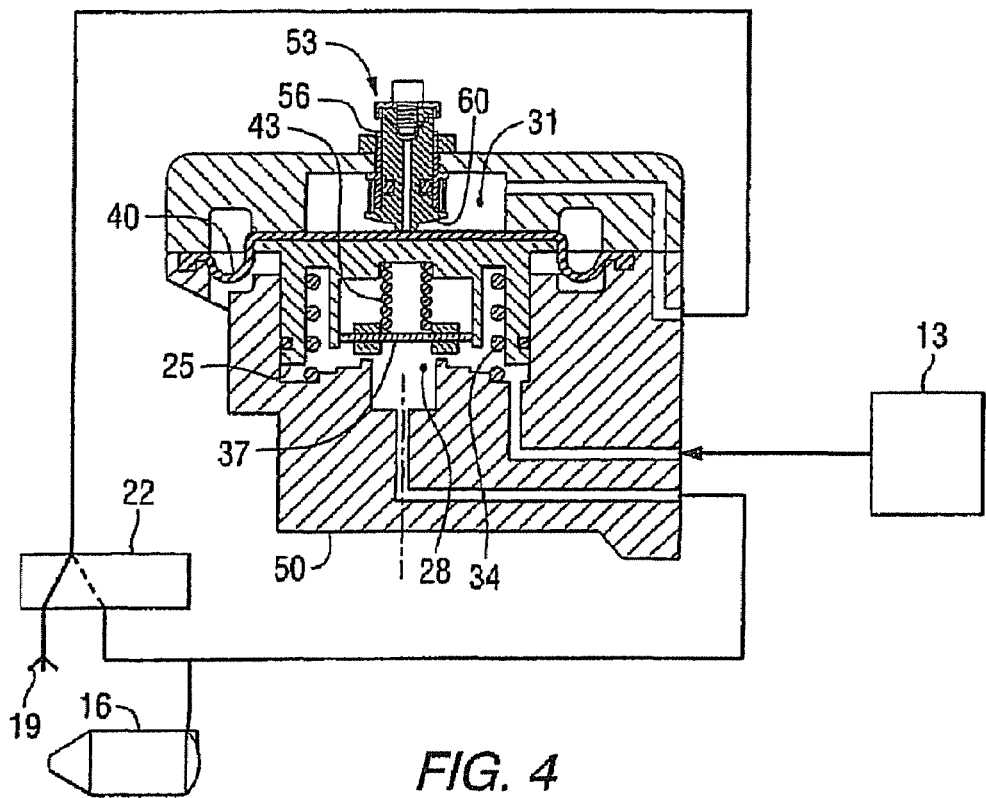
FIG. 4 illustrates an embodiment of a release graduating proportioning valve according to the invention, shown in a "full open" position.

Referring now to FIG. 4, an embodiment of a release graduating proportioning valve 50 (hereinafter "RGV") according to the invention is illustrated. The RGV 50 can comprise a conventional proportioning valve which has been modified, according to the invention, to operate in a graduated release mode. In a basic form, this can involve simply adding a graduated release BCP exhaust valve member 53 to the standard proportioning valve, which can be operated by the proportioning piston 25 in concert with the existing BCP supply valve.

As illustrated, the supply side of the RGV 50 is unchanged from the conventional proportioning valve, and can operate in the manner described above during pressure reduction in the brake pipe, which indicates a brake application caused by the brake control valve 13. The modification adds the BCP graduated release valve member 53 to allow for incremental exhaust to provide proper and responsive operation in a graduated release mode. The RGV 50 can thus operate properly in either a pneumatic graduated release system or with ECP brake control. The RGV 50 is shown in the release position in FIG. 4, and all functions and pressures can be identical with the standard proportioning valve 10 in this same position. Note that the additional parts incorporated into the standard proportioning valve 10 to make the RGV 50 can be relatively small in size. This reduces both cost and weight, and is all that is needed because only a small exhaust passage is required to follow the relatively slow release of the brake control valve 13, which is so choked that brake cylinder pressure can not be exhausted faster than auxiliary reservoir pressure can be restored.

Figure 5:
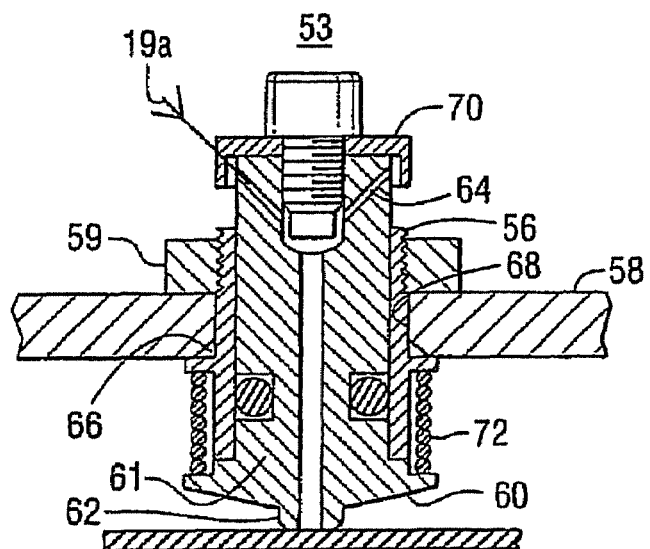
FIG. 5 is a detailed view of an embodiment of a release graduating valve as can be used in the release graduating proportioning valve shown in FIG. 4.

As shown in FIG. 5, this embodiment of the RGV 50 can generally be comprised of two main parts: a bushing 56 which is inserted through a hole 68 in the top cover 58 of the RGV and tightened into place with a retaining nut 59; and a valve assembly 60, which an be a spring loaded stem 61 with a seat 62, which can be integral. The seat 62 seals on the top surface of the rubber diaphragm 40, and when pulled away from the diaphragm 40 will vent the control volume 31 above the diaphragm 40 to atmosphere through a small hole 64. The bushing includes a static seal 66 and the hole 68 in the top cover 58 can be machined with a proper chamfer to permit the seal 66 to function. Furthermore, machining of the hole 68 can be done so as to maintain fairly tight control, for example, +/−0.003 inch, of linear tolerances to help insure that the valve assembly 60 will function reliably.

The graduating valve member 53 can also include a cap 70 which can both fix the stroke of the valve stem 61 and provide a shield against the entrance of dirt and moisture. It can be seen that the compressed valve spring 72 holds the valve seat 62 against the rubber top of the diaphragm 40, sealing the control volume 31 above the diaphragm 40 against leakage through a central passageway 74 provided in the valve stem 61. This will be the case as the proportioning piston 25 and diaphragm 40 move downward from the full open position through the range of travel identical to the available valve travel illustrated. This available travel is such that until the proportioning piston 25 is below the balance position, and about halfway to the over travel position, the valve assembly 60 will remain closed. However, when the proportioning piston 25 moves lower than this, the available travel will be used up and the valve stem 61 will no longer be able to follow the diaphragm 40 and proportioning piston 25 down. Thus, as the proportioning piston 25 nears the over travel position (which can only happen when supply pipe pressure from the brake control valve 13 is being reduced and BCP is not) the valve assembly 60 will open and begin venting the control volume 31 to atmosphere 19a via central passageway 74, and with it brake cylinder pressure.

However, as this venting occurs the force urging the proportioning piston 25 downward will lessen at a greater rate than brake cylinder supply pressure, until the proportioning piston 25 moves upward to the balanced position, returning the graduated release valve member 53 to its closed position. This action will continue until the pressure at which the load sensor valve 22 returns to release, after which control volume 31 pressure will all be vented to atmosphere 19 via the load sensor valve 22, and the brake cylinder supply check valve 34 will be pulled open.

Figure 6:
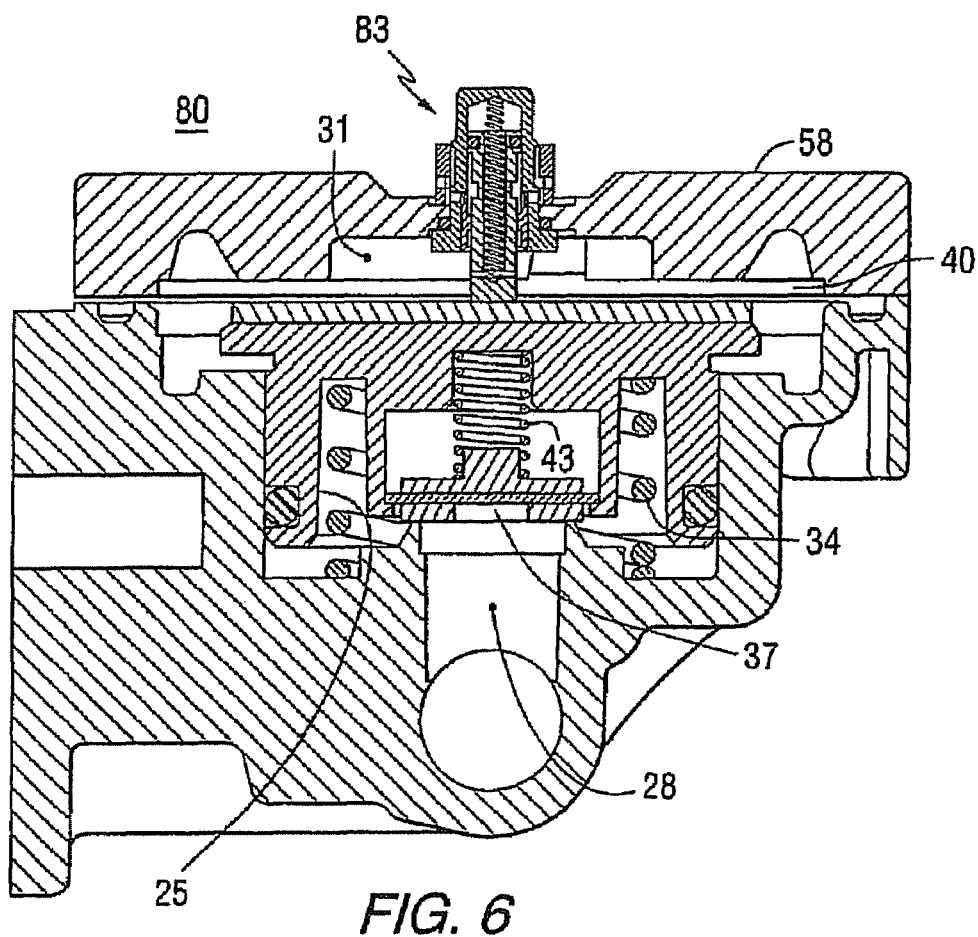
FIG. 6 illustrates another embodiment of a release graduating proportioning valve according to the invention.

Referring now to FIG. 6, another embodiment of a RGV 80 according to the invention is illustrated. In this embodiment, the graduated release valve member 83 can essentially be a pressure-balanced spool valve actuated by the proportioning piston 25, in concert with the existing BCP supply check valve 37. In the configuration illustrated, the graduated release valve member 83 is positioned above the proportioning piston 25. Alternatively, the graduated release valve member 83 could be positioned beneath the proportioning piston 25. In either case the graduated release valve member 83 is closed when the proportioning piston 25 is positioned at or above the closure point of the supply check valve 37. There is a dead lap zone where both the graduated release valve member 83 and the proportioning valve 80 are closed, as the proportioning piston 25 moves incrementally downward from the supply valve threshold seating position. Further downward movement of the proportioning piston 25 beyond this small lap zone will cause the graduated release valve member 83 to open and directly exhaust downstream BCP.

As BCP is being developed or increased, the proportioning valve portion of the RGV 80 works exactly as described above for the standard proportioning valve 10. However, if the upstream BCP is incrementally exhausted at the brake control valve 13 (not shown in this figure) at any time, the reduced pressure beneath the balanced proportioning piston 25 will cause the proportioning piston 25 to move downward, under the influence of the opposing downstream BCP, which will open the graduated release valve member 83 to begin to reduce downstream pressure to the degree needed to rebalance the proportioning piston 25. The proper proportioning between the upstream and downstream BCP will thereby be automatically maintained for either incremental increases or decreases in the upstream pressure, as directly controlled, for example, by a brake control valve 13. With the RGV 80, the brake control valve 13 can be either a graduated release pneumatic type, or a direct electronic type, such as an ECP control unit.

As explained previously in regard to the operation of the conventional proportioning valve 10, the equalizing reservoir (not shown) is connected to the downstream BCP at the load sensor valve 22 (not shown here), and equalizing reservoir pressure will follow the BCP for all such graduations. If the upstream BCP is reduced below the equivalent of a minimum brake application, for example approximately 10 psi BCP, the brake control valve 13, or ECP unit, will normally provide a complete and direct release of BCP to zero. This will result in a reset of the load sensor valve 22, and the exhaust of the equalizing reservoir.

Figure 7:
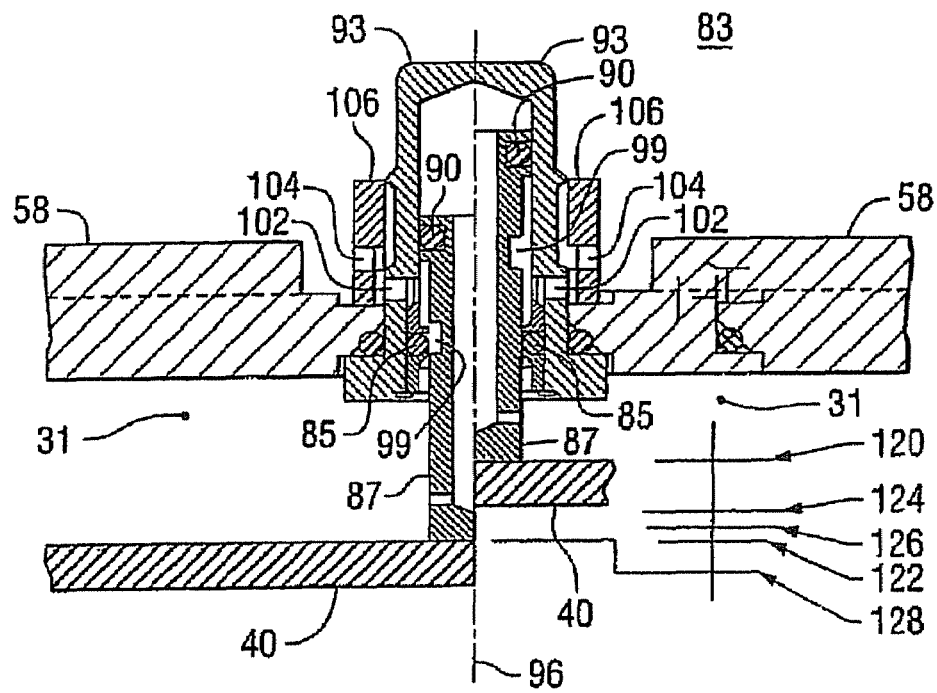
FIG. 7 is a detailed view of an embodiment of a release graduating valve as can be used in the release graduating proportioning valve shown in FIG. 6.
Figure 8A:
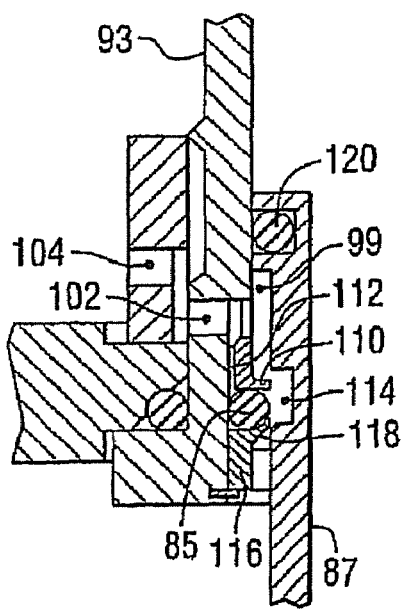
FIGS. 8A and 8B are detail views illustrating a portion of the valve structure according to the invention by which an O-ring seal is retained.
Figure 8B:
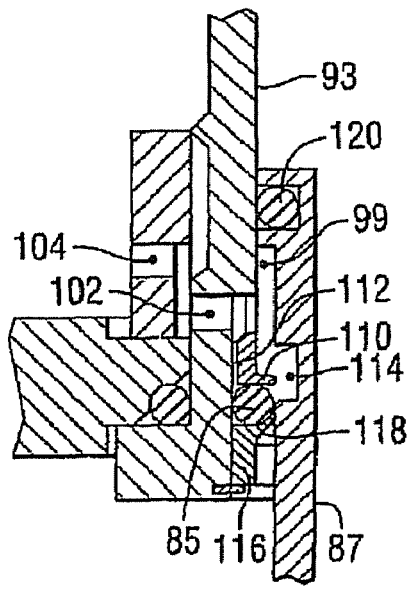

Referring now to FIGS. 7-8B, an embodiment of a graduated release valve member 83 is illustrated which can prevent blowout of an O-ring valve seal 85, and can be made capable of reliable operation in the service anticipated. FIG. 7 shows the parts of the graduated release valve member 83 in both the open position (left view) and the closed position (right view), along with the diaphragm 40 of the proportioning valve 80 which is driving the graduated release valve member 83. The spool 87 can be very slightly biased in the downward direction by the diameter of the upper spool O-ring 90. Also, a slight downward bias can be added by providing a low rate spring (not shown) on top of the spool 87.

As shown, the graduated release valve member 83 can comprise the central spool 87 and a housing 93 for the spool 87. The spool 87 is shown on the right of the centerline 96 in the extreme upper position 120, where the spool 87 would be in all cases where there was no pressure above the diaphragm 40, such as any loaded car condition, and also an empty car with brakes released, or insufficiently applied to move the proportioning piston 25 down. The spool 87 is shown to the left of the centerline 96 in the full down position 122, as would be the case after a brake application on an empty car had been made and partially released.

Note that the housing 93 carries the O-ring valve seal 85 near the bore entry, and that the spool 87 is drilled to provide an overbalance pressure on the proportioning piston 25. Also, in the position shown to the right of the centerline 96, the captive O-ring 85 seals the communication between the control volume 31 above the diaphragm 40, and atmosphere 19a. In the position at the left, the groove 99 in the spool 87 allows pressure above the diaphragm 40 in the control volume 31 to vent to atmosphere. The path to atmosphere is past the O-ring 85 into the groove 99 in the spool 87, out through the drilled cross hole 102 in the housing 93, and thence to the atmosphere 19a through the drilled cross hole 104 in the lower skirt of the retaining nut 106.

The diagram to the right of the centerline 96 shows the position of the top of the diaphragm 40 not only in these two positions, but also in two other positions of interest. The first of these two other positions is the "empty car lap" position 124. This is the position of the top of the diaphragm 40 when the brake is applied and RGV 80 has admitted sufficient air to the brake cylinder 16 to satisfy the design balance pressure differential of the proportioning piston 25. In this position, the spool 87 is still above the "cracking point" 126, for example by about 0.040 inch, so there should be no exhaust at or near the normal operating position of the RGV 80.

Beneath this point is the cracking point 126, where the graduating release valve member 83 is just sealed by a hair line, and beneath that is the lowermost, over travel position 128 of the diaphragm 40, which normally occurs while the brake cylinder supply is being released and the proportioning check valve 37 is being held on the seat because the brake cylinder supply pressure is still above actual brake cylinder pressure. All travel from the cracking point 126 to the maximum over travel position 128 opens the graduating release valve member 83 wider, and at the over travel position 128 the valve 83 opening is approximately the equivalent of 0.100 inch, which should provide adequate exhaust capacity to reduce the brake cylinder pressure in step with a graduated brake release.

Referring more particularly to FIGS. 8A and 8B, one of the features of this embodiment of the graduated release proportioning valve member 83 is the way in which the sealing O-ring 85 near the housing entrance is retained against blowout when the valve 83 is opening. This O-ring and the retention members are shown enlarged in the figures, which show the spool 87 in both the cracking position 126 (FIG. 8A), and the maximum over travel position 128 (FIG. 8B), which are as defined in connection with FIG. 7. A shown in FIG. 8b, where the O-ring 85 is at the cracking position 126, the O-ring 85 ring is captured between an upper retainer 110 and a lower retainer 116. The upper retainer 110 has a vent passage 112 behind the O-ring 85. So long as the O-ring 85 is in the annular groove 114, this small vent 112 passes no air. However, if the O-ring 85 attempts to leave the annular groove 114 this vented area prevents pressure from building up behind the O-ring 85, thus inhibiting the O-ring 85 from blowing out during valve opening. With this feature, seal pinching and excess wear should be avoided, and an extremely simple low cost valve mechanism can thereby be provided. The lower retainer 116 includes a skirt portion 118. While the lower, or valve seat O-ring 85 is referred to as "captive," the purpose of the skirt 118 below the O-ring 85 is not solely to "capture" the O-ring 85. One purpose of the skirt 118 is to assure repeatability in the position of the spool 87 at which the valve cycles, or seals. Another purpose of the skirt 118 is to prevent distortion of the O-ring 85 when the valve opens. The pressure acting on the O-ring when the valve is open will tend to draw the O-ring out from between the upper 110 and lower 116 retainers, causing the O-ring 85 to distort into a generally oval shape. The skirt 118 supports the outside of the O-ring 85, and prevents, or at least minimizes, such distortion.

The material of the housing 93 can be 401 stainless in order to provide both corrosion protection and a good honed finish for the balance seal 120 to run on. Material for the spool 87 can be manganese bronze, to provide freedom from galling as well as physical strength and an O.D. ground finish to ride on the sealing O-ring 85. Both seal retainers 110, 116 can be stainless as well, and the retaining nut 106 can be free machining steel. All of the O-rings can be made of Viton, for both temperature and wear properties, although flourosilicon could also be used.

Figure 9:
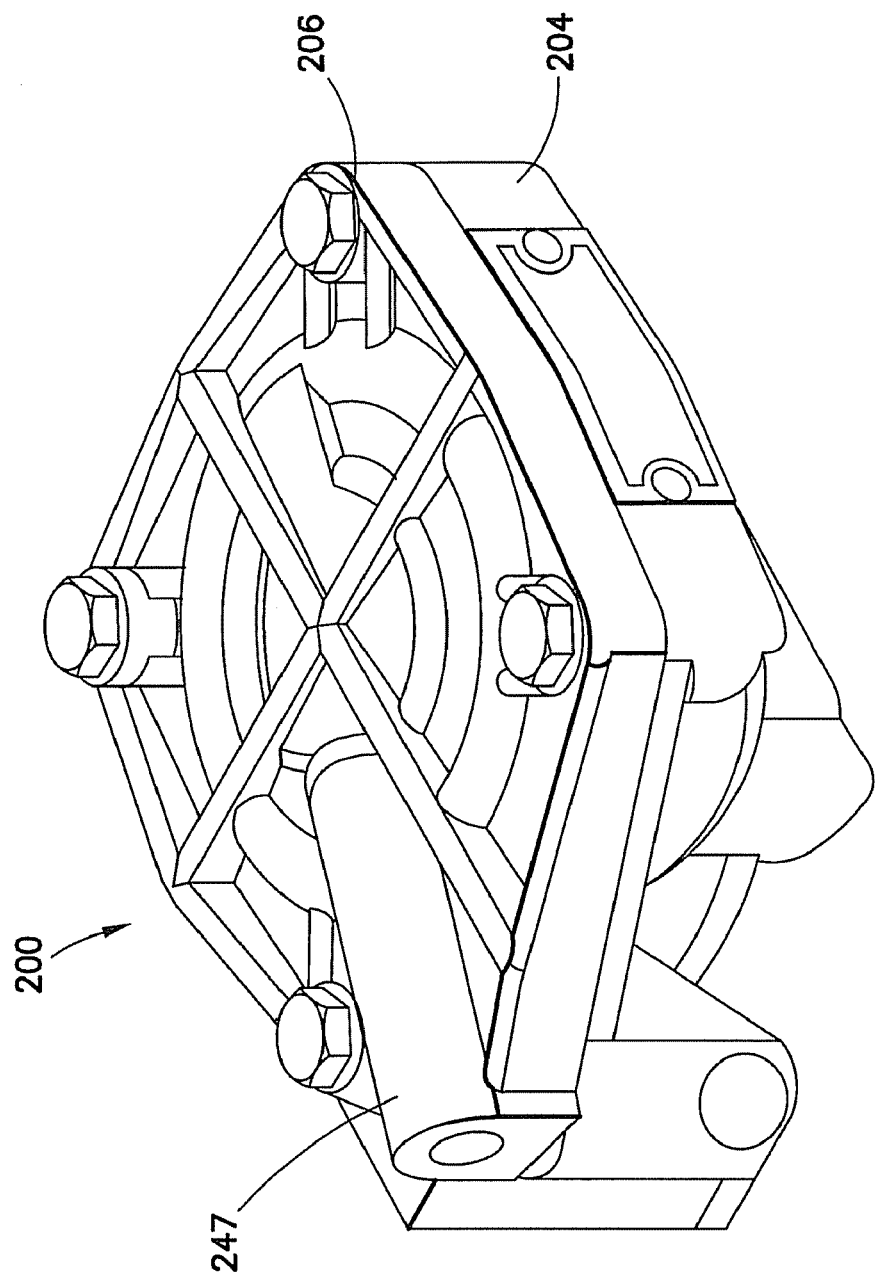
FIG. 9 is a perspective view of another embodiment of a release graduating proportioning valve according to the invention.
Figure 10:
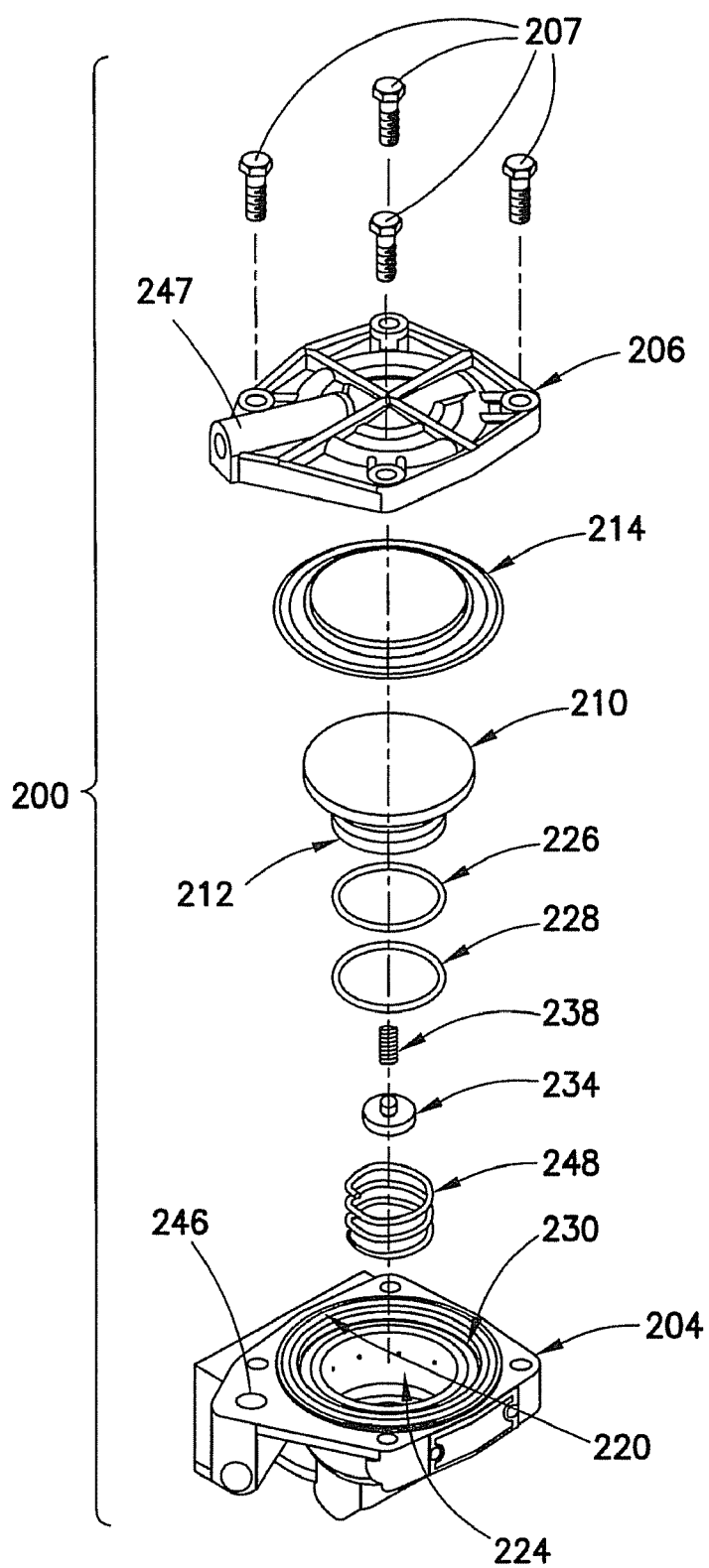
FIG. 10 is an exploded view of the graduating release valve shown in FIG. 9.
Figure 11:
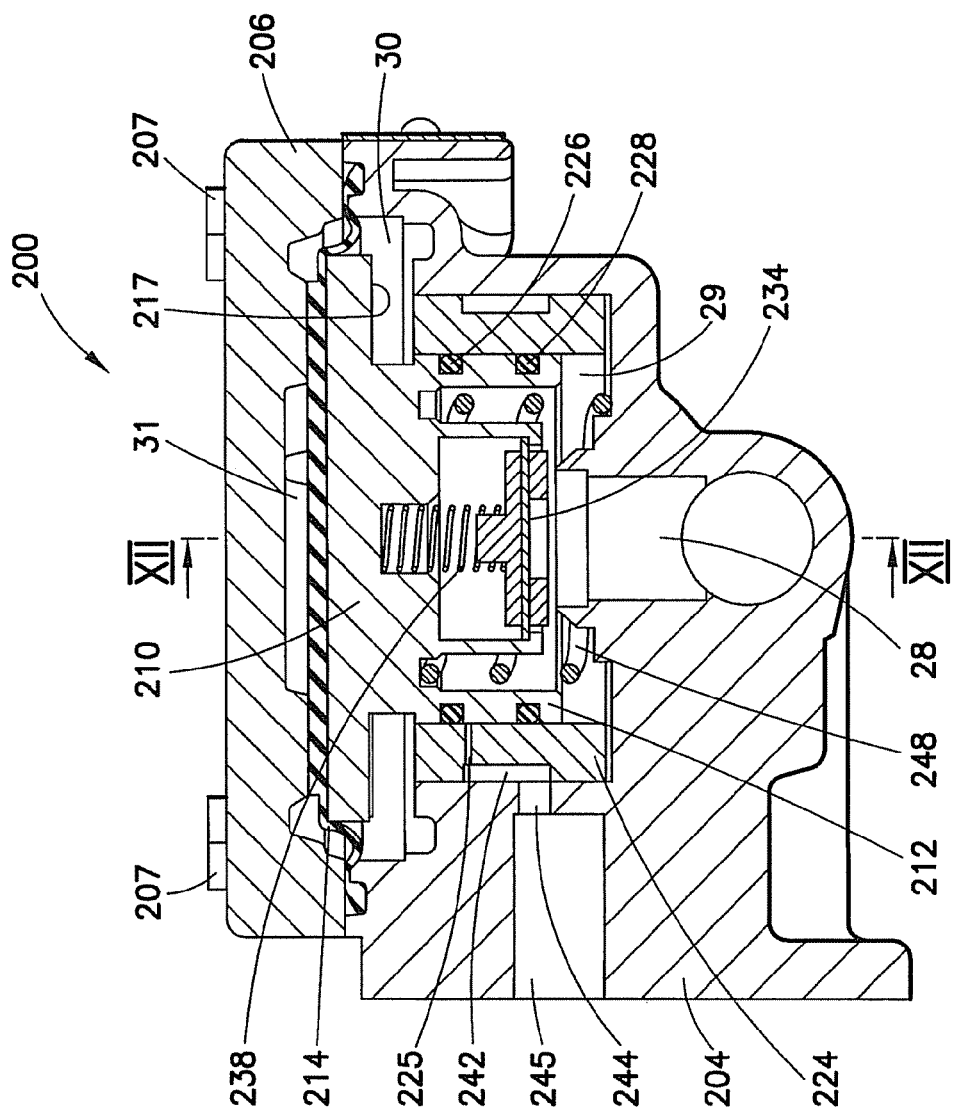
FIG. 11 is a cross section view of an embodiment of a release graduating valve such as shown in FIGS. 9 and 10, with the piston shown in a full up position.

Referring now to FIGS. 9 through 11, a further embodiment of a release graduating proportioning valve RGV 200 is illustrated. In the RGV 200, the graduating release BCP exhaust function is carried out internally within the body of the RGV 200, rather than by a separate graduated release valve member, such as the previously described graduated release valve members 53, 83 (see FIGS. 4, 5 and 6, 7) which are separate valve members that are connected to the RGV 50, 80 by providing a hole 68 through the cover 58, with the end of the valve member 53, 83 disposed therethrough into the control volume 31.

As shown best in FIGS. 9 and 10, the RGV 200 is an assembly comprising a valve body 204 and a cover 206 which enclose a specially modified proportioning piston 210 having downwardly extending piston skirt portion 212. The cover 206 can be secured to the valve body 204 using, for example, conventional fasteners 207. The RGV 200 further includes a diaphragm 214, a pair of seals 226, 228, check valve 234 with associated check valve spring 238, and main piston spring 248, all of which (except in regard to using two seals 226, 228) are operatively associated with the proportioning piston 210 in the same manner as in the previously described embodiments of RGVs 50 and 80. Likewise, the diaphragm 214 separates the front face 216 of the proportioning piston 210 from the control volume 31 on the underside of the cover 206, thus defining the control volume 31.

Figure 12:
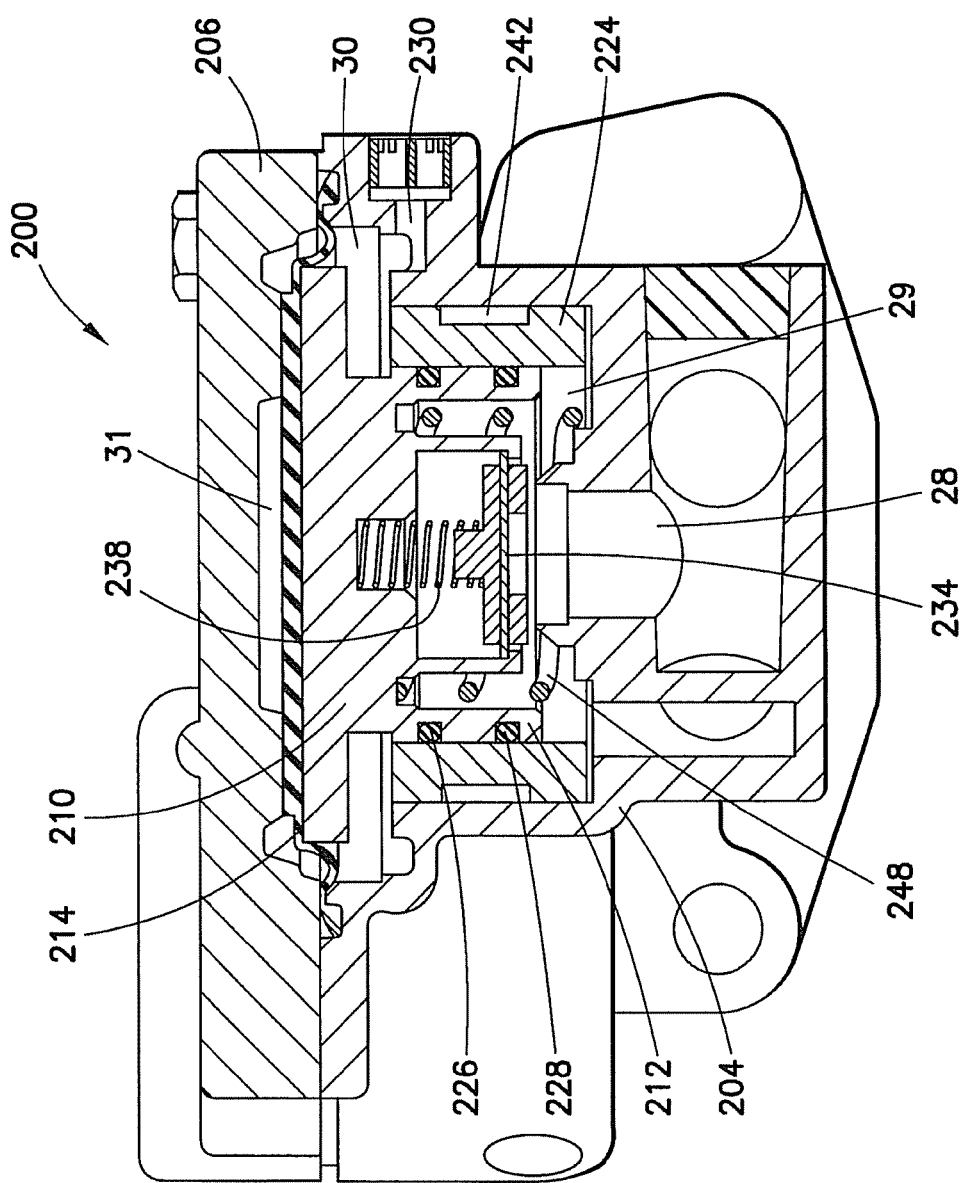
FIG. 12 is a section view taken through line XXII-XXII.

Referring more particularly to FIGS. 11 and 12, the piston skirt portion 212 is slidably received in a bore 220 formed in the valve body 204, just as in the prior embodiments of the RGV 50, 80. However, according to the invention, in the RGV 200 the piston skirt 212 is modified, as compared to, for example, the piston skirt 25 shown in FIG. 4, to carry a pair of spaced apart seals 226, 228, which are held thereby intermediate the piston skirt 212 and the bore 220. FIGS. 11 and 12 illustrate the RGV 200 in the full upward travel position of the proportioning piston 210 at which the control volume 31 is isolated from atmosphere. In this position, a port 225 is captured between the seals 226 and 228. A port 225 can also be provided which is connected to the control volume 31, as will be described in more detail hereinafter.

As can be seen in the sectional view in FIG. 12, the valve body 204 can further be provided with a port 230 connected to atmosphere, and also to volume 30, such that volume 30 is connected to atmosphere. Seals 226 and 228 also seal volume 30 from volume 29 on the underside of the piston 210. Overall, the proportioning piston 210 is movable between a first position at which the control chamber 31 is isolated from volume 30, and thus isolated from the atmosphere, and a second position at which the control volume 31 is connected to volume 30, and thus connected to atmosphere. Generally, movement of the proportioning piston 210 occurs responsive to the prevailing pressure in pressure chambers acting on opposite sides of the piston 210. More particularly, the pressure in the control chamber 31 acts on top of the piston 210, whereas the pressure in volume 29 (brake pipe pressure) acts on the underside of the piston 210, as will be explained in more detail below. Basically, movement of the proportioning piston 210 to either vent the control chamber 31 to atmosphere, or cut off the connection of the control volume 31 to atmosphere, occurs responsive to the relative pressures in volume 29 and the control volume 31.

Initially, as the pressure in the control volume 31 increases, the proportioning piston 210 moves downwardly from the first position to an intermediate, e.g., mid-travel, position at which the check valve 234 seats, cutting off volume 28, and defining volume 29, which is connected to brake pipe pressure. After the check valve 234 seats, the piston 210 will continue to move down toward the second position only in response to a reduction in brake pipe pressure in volume 29. As brake pipe pressure reduces, the piston 210 moves to the full down travel position, i.e., the second position, at which the control volume 31 is connected to volume 30, and thus to the atmosphere. At this position of the piston 210, the control volume 31 will continue to vent to atmosphere until the pressure in control volume 31 is sufficiently reduced that the piston 210 will begin to move upwardly again, to a position pursuant the opposing pressure forces being in equilibrium.

According to a presently preferred embodiment of the RGV 200, a bushing 224 can be provided in the bore 220 such that the piston skirt portion 212 is slidably disposed in the bushing 224. Preferably, the outer surface the bushing 224 can have an annular air passage 242, and the inner surface of the bushing 224, which is adjacent the skirt portion 212, can have a plurality of radially spaced through-holes, e.g., through-hole 225, which communicate with the annular air passage 242. The annular air passage 242 communicates with a port 244 in the valve body 204, and ultimately communicates with the control volume 31 via port 245 which is connected to port 246 (shown in FIG. 10) and a further air passage (not shown) provided in, for example, a raised generally cylindrical portion 247 of the cover 206 (shown in FIG. 9). Consequently, through-holes 225 are ultimately connected to the control volume 31.

Figure 13:
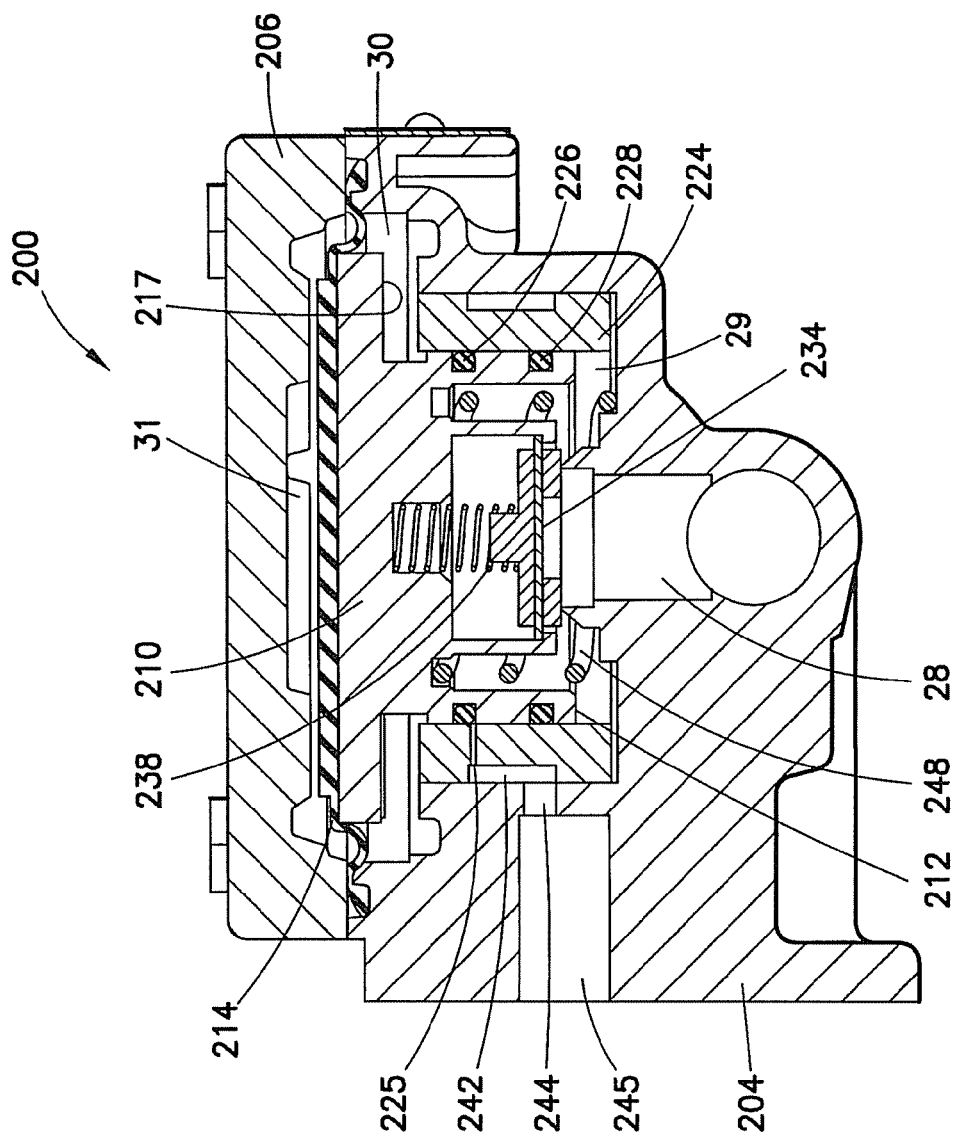
FIG. 13 is a section view as shown in FIG. 1, except with the piston shown mid-travel with the check valve seated.
Figure 14:
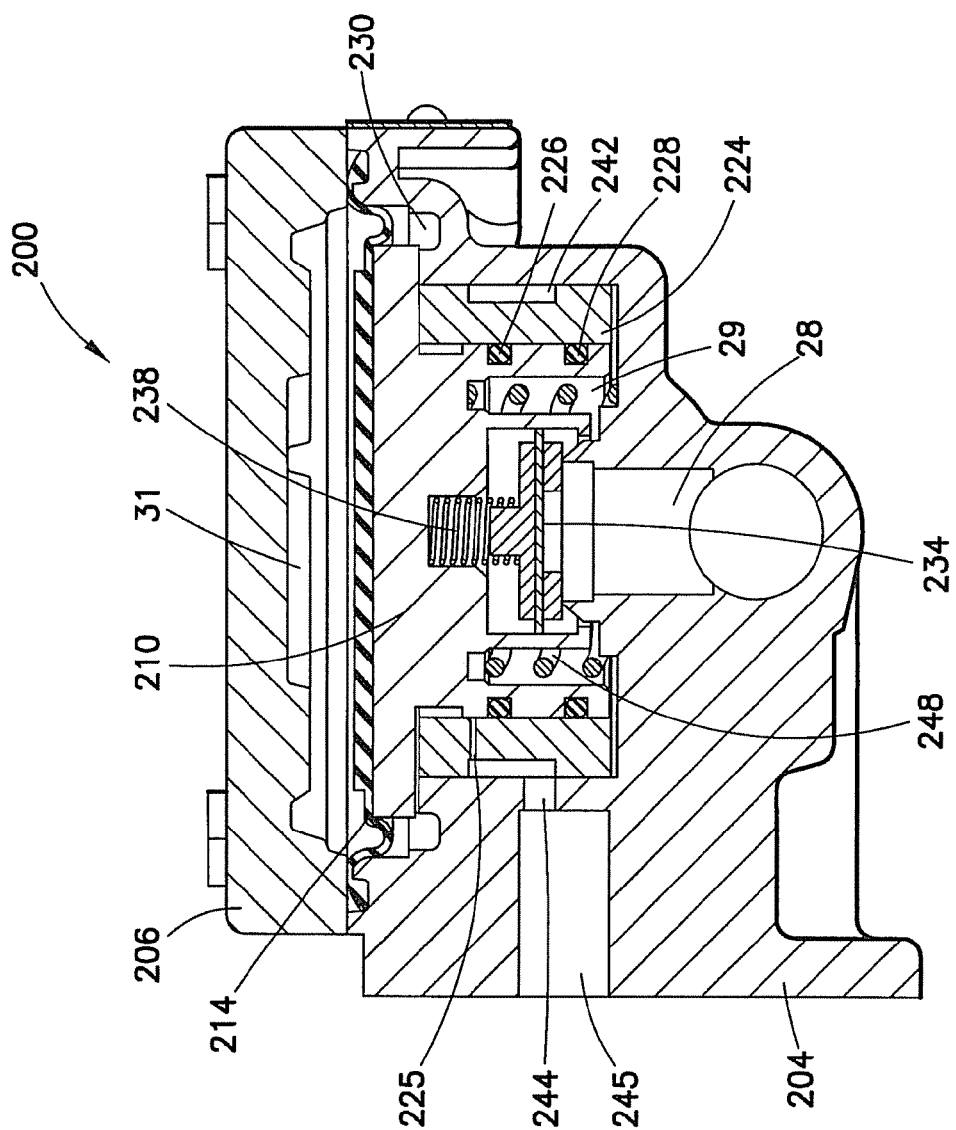
FIG. 14 is a section view as shown in FIGS. 11 and 13, except with the piston shown in a full down position.
Figure 19:
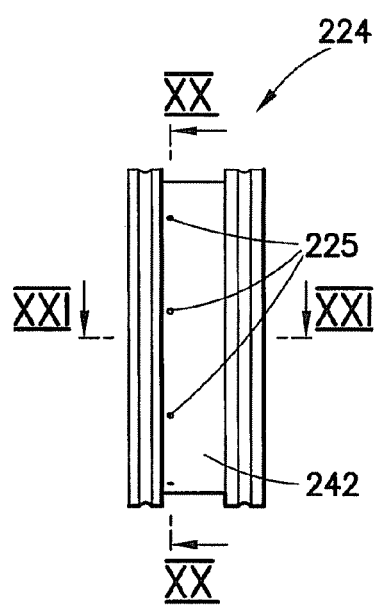
FIG. 19 is a side view of the ported bushing shown in FIG. 18.
Figure 20:
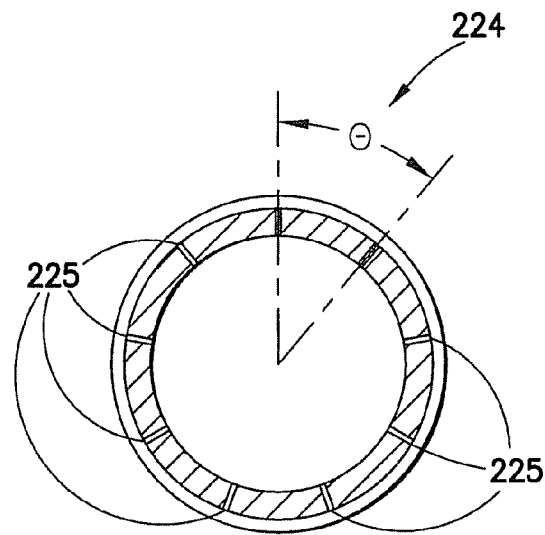
FIG. 20 is a section view taken through line XX-XX in FIG. 19.
Figure 18:
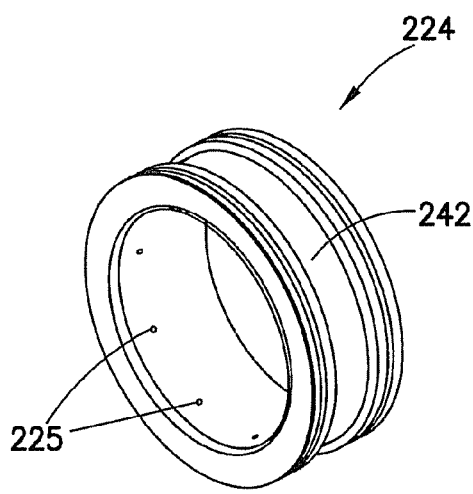
FIG. 18 is a perspective view of an embodiment of a ported bushing for a release graduating proportioning valve such as shown in FIG. 11.
Figure 21:
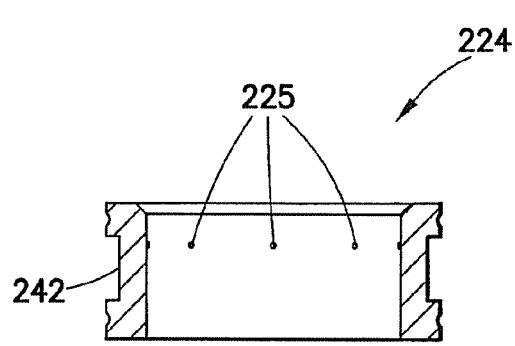
FIG. 21 is a section views taken through line XXI-XXI in FIG. 19.

The proportioning piston 210 is movable within the valve body 204 in the conventional manner. Consistent with the preceding description, at the full upward travel position of the piston 210, illustrated in FIGS. 11 and 12, the through-holes 225 in the bushing 224 are captured between the upper 226 and lower 228 seals on the piston skirt 212, such that the through-holes 225 are isolated from chamber 30 (which is connected to atmosphere via port 230 as explained above). However, when pressure in the control volume 31 increases, the modified proportioning piston 210 will move downwardly to a mid-travel position, illustrated in FIG. 13, at which the check valve 234 seats, cutting off volume 29, and forming volume 31, which is at brake pipe pressure. At this position, the piston 210 will travel further downwards to a full down position only responsive to a reduction of brake pipe pressure in volume 29. At the full down position, illustrated in FIG. 14, the uppermost seal 226 will pass below the through-holes 225, thus connecting the through-holes 225 to volume 30 and thus the atmosphere via port 230. As explained above, through-holes 225 communicate with the control volume 31, which is thus vented to atmosphere at this position of the piston 210. The control volume 31 will vent to atmosphere until the pressure in the control volume 31 is reduced to a degree that the main piston spring 248, and the pressure in volume 29, begin to move the proportioning piston 210 upwardly again, to a position at which the uppermost seal 226 passes back over the through-holes 225. At this position, the through-holes 225 are once again captured between the upper 226 and lower 228 seals and the control volume 31 is once again isolated from the atmosphere, and the cycle begins anew with the next brake application.

The ported bushing 224 thus cooperates with the modified main piston 210 to enable the graduating release function of the RGV 200. The ported bushing 224 can be press fit into the bore 220, which can be oversized to accommodate the bushing 224 in which the piston skirt 212 slidably moves. The upper 226 and lower 228 seals can be carried in respective upper 229 and lower 230 annular grooves provided in the outer surface of the piston skirt portion 212. In FIG. 11, the piston 210 is shown in the full upward travel position, and the seals 226, 228 are spaced apart along the length of the piston skirt 212 so as to seal off upper and lower sides of the through-holes 225 in the ported bushing 224. The through-holes 225 can comprise, for example, a plurality of holes drilled through the wall of the bushing 224 into the annular air passage 242, at radially spaced apart locations around the perimeter, or circumference, of the bushing 212. The through-holes 225 communicate with the annular passage 242 in the outer surface of the bushing 224 which communicates with port 244 through the main body of the RGV 200. The seals 226, 228 can be spaced such that the lower seal 228 never passes above the through-holes 225, whereby the volume 28 communicating on the back face 217 of the piston 210 is never connected to the atmosphere. The graduated release function involves connecting only the control volume 31 to atmosphere. The seals 226, 228 can be spaced such that the lower seal 228 never passes above the through-holes 225, so that the volume 28 communicating on the bottom, horizontal skirt surfaces of the piston 210 is never connected to the atmosphere. Moreover, consistent with the "graduated release" function of the RGV 200, the connection of the control volume 31 to atmosphere will only persist until the pressure in the control volume 31 is reduced to the point where the main piston spring 248 and the pressure in volume 29 overcomes the reduced pressure in the control volume 31 and urges the proportioning piston 210 upwardly again to a position where the upper seal 226 crosses back over the through-holes 225, and once again isolates the control volume 31 from the atmosphere.

As shown best in FIGS. 15-17, the modified proportioning piston 210 is also provided with recesses 250 on the underside 217 of the piston 210 to facilitate air flow from the control volume 31 to atmosphere when the proportioning piston 210 has moved all the way down against the bushing 224, as occurs at maximum downward travel of the piston 210. In a preferred embodiment, as shown, three recesses 250 can be provided, at equally spaced positions about the perimeter of the underside 217 of the piston 210. For three recesses 250, angle φ, shown in FIG. 16, can be 120 degrees.

FIGS. 18-21 better illustrate the ported bushing 224, including the multiple through-holes 225 provided, such as by drilling, through the side wall of the bushing 224. In the embodiment shown, nine through-holes 225 can be drilled, preferably equally spaced about the circumference of the bushing 224. For nine holes 225 at equal spacing, angle θ is 40 degrees.

This embodiment of the RGV 200 thus keeps all of the porting of the control volume 31 to atmosphere internal to the RGV 200, as compared to the previously described embodiments of RGVs 50, 80 wherein a separate, external graduating valve member 53, 83 is fitted into the cover of the valve. As can be seen, the through-holes 225 connect with the annular passage 242 on the outer surface of the bushing 224.

While the invention has been described in regard to certain specific embodiments as integrated with a conventional proportioning valve, it is to be understood that other embodiments can be utilized with other styles or designs of valves. In particular, other embodiments could comprise a totally new proportioning valve body, and valve parts could be used to incorporate the release graduating valve member according to the invention. Also, while the embodiments shown may use components such as those made or sold by Westinghouse Air Brake Company™, it is to be understood that other valves, including valves made by other entities, may also be used to obtain the invention described herein.

Moreover, although certain embodiments of the invention have been described in detail, it will be appreciated by those skilled in the art that various modifications to those details could be developed in light of the overall teaching of this disclosure. Accordingly, the particular embodiments disclosed herein are intended to be illustrative only and not limiting to the scope of the invention which should be awarded the full breadth of the following claims and any and all embodiments thereof.

What is claimed is:

1. A release graduating proportioning valve for a rail car brake system having a brake pipe, a brake cylinder, and a load sensor valve for detecting an empty/loaded car condition, said release graduating proportioning valve comprising:
   a. a proportioning piston having a control volume communicating on a first side of said piston and a second volume communicating on a second side of said piston;
   b. a valve body in which said proportioning piston is movably received, said valve body having a port to atmosphere;
   c. said load sensor valve having an empty car setting in which said control volume is connected to atmosphere via said load sensor valve, and a loaded car setting in which said control volume is connected to said brake cylinder via said load sensor valve;
   d. said proportioning piston movable between first and second positions, said control volume isolated from said port to atmosphere at said first position, and said control volume communicating with said port to atmosphere at said second position, wherein said control volume is connected to atmosphere responsive to movement of said proportioning piston;
   e. said valve body having a bore;
   f. said proportioning piston having a skirt portion slidably received in said bore;
   g. a first air passage through said bore, said first air passage communicating with said control volume;
   h. at least one seal carried by said skirt portion, said at least one seal positioned intermediate said skirt portion and said bore; and
   i. wherein at said first position said at least one seal is positioned between said first air passage and said port to atmosphere such that said at least one seal isolates said control volume from atmosphere, and at said second position said control volume is connected to atmosphere via said first air passage.

2. The release graduating proportioning valve of claim 1 further comprising a bushing disposed in said bore, said skirt portion slidably received in said bushing, and said first air passage provided through said bushing.

3. The release graduating proportioning valve of claim 2 further comprising: a. said bushing having an inner surface adjacent said skirt portion and an outer surface adjacent said bore; b. said outer surface having an annular air passage communicating with said port to atmosphere; and c. said first air passage provided through said inner surface in communication with said annular air passage, such that said first air passage connects said control volume to atmosphere via said annular air passage and said port to atmosphere when said proportioning piston moves to said second position.

4. The release graduating proportioning valve of claim 3 wherein said first air passage further comprises a plurality of through-holes provided at spaced apart locations around a perimeter of said inner surface.

5. The release graduating proportioning valve of claim 1 further comprising:
   a. said piston having a back face, said skirt portion extending from said back face, and said back face having at least one recessed region; and
   b. at said second position, part of said back face which is not recessed abuts said valve body, such that said at least one recessed region facilitates air flow from said control volume to atmosphere.

6. The release graduating proportioning valve of claim 1 wherein said at least one seal further comprises a pair of seals.

7. The release graduating proportioning valve of claim 6 wherein said pair of seals are carried at spaced apart locations on said skirt portion, and wherein said first air passage is captured between said at least two seals until said piston moves to said second position.

8. The release graduating proportioning valve of claim 1 wherein movement of said proportioning piston between said first and second positions occurs responsive to pressure in said control volume, said pressure in said control volume communicates on a first side of said proportioning piston, and pressure in said brake cylinder, which communicates on a side opposite said first side of said proportioning piston.

9. The release graduating proportioning valve of claim 8 wherein:

a. said control volume is isolated from atmosphere until pressure in said brake pipe is reduced sufficiently to enable pressure in said control volume to move said proportioning piston to said second position to connect said control volume to atmosphere; and b. said control volume is connected to atmosphere until pressure in said control volume is reduced sufficiently to enable at least said brake pipe pressure to move said proportioning piston to said first position to isolate said control volume from atmosphere.

* * * * *